(12) United States Patent
Schulz

(10) Patent No.: US 12,372,137 B2
(45) Date of Patent: Jul. 29, 2025

(54) DEVICE FOR TERMINATION OF A ROPE

(71) Applicant: Neil Schulz, Hailsham (GB)

(72) Inventor: Neil Schulz, Hailsham (GB)

( * ) Notice: Subject to any disclaimer, the term of this patent is extended or adjusted under 35 U.S.C. 154(b) by 0 days.

(21) Appl. No.: 18/562,664

(22) PCT Filed: May 18, 2022

(86) PCT No.: PCT/GB2022/051254
§ 371 (c)(1),
(2) Date: Nov. 20, 2023

(87) PCT Pub. No.: WO2022/243681
PCT Pub. Date: Nov. 24, 2022

(65) Prior Publication Data
US 2024/0240694 A1   Jul. 18, 2024

(30) Foreign Application Priority Data

May 21, 2021   (GB) ...................... 2107295

(51) Int. Cl.
*F16G 11/05*   (2006.01)
*F16G 11/10*   (2006.01)
*F16G 11/14*   (2006.01)

(52) U.S. Cl.
CPC ............ *F16G 11/05* (2013.01); *F16G 11/103* (2013.01); *F16G 11/146* (2013.01)

(58) Field of Classification Search
CPC ...... F16G 11/05; F16G 11/103; F16G 11/146; F16G 11/14; F16G 11/12; D07B 2201/2095
See application file for complete search history.

(56) References Cited

U.S. PATENT DOCUMENTS

| | | | | |
|---|---|---|---|---|
| 3,932,697 A | * | 1/1976 | Hood ..................... | H02G 7/056 174/79 |
| 5,231,752 A | * | 8/1993 | Hereford ................. | F16G 11/05 403/275 |
| 2015/0298770 A1 | * | 10/2015 | Firing ................... | F16G 11/146 24/122.3 |

* cited by examiner

*Primary Examiner* — David M Upchurch

(57) ABSTRACT

A device for termination of a rope comprises a cylinder extending longitudinally from a base to a cone or pyramid, wherein the cylinder defines at least one channel for receiving a pair of subropes substantially perpendicular to the longitudinal axis of the cylinder. It can be used for termination of rope manufactured from synthetic fibres or constructed from multiple subropes.

20 Claims, 4 Drawing Sheets

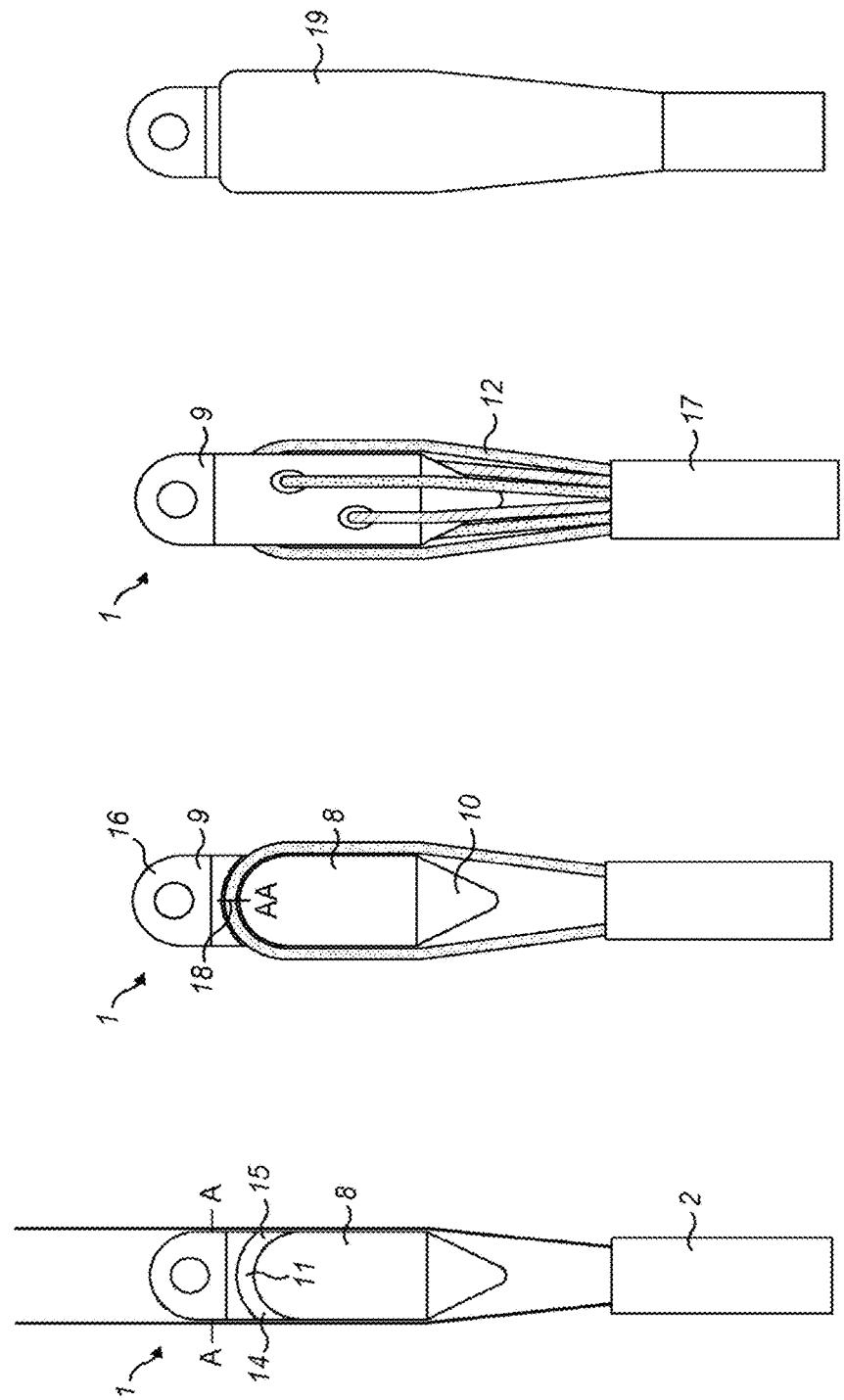

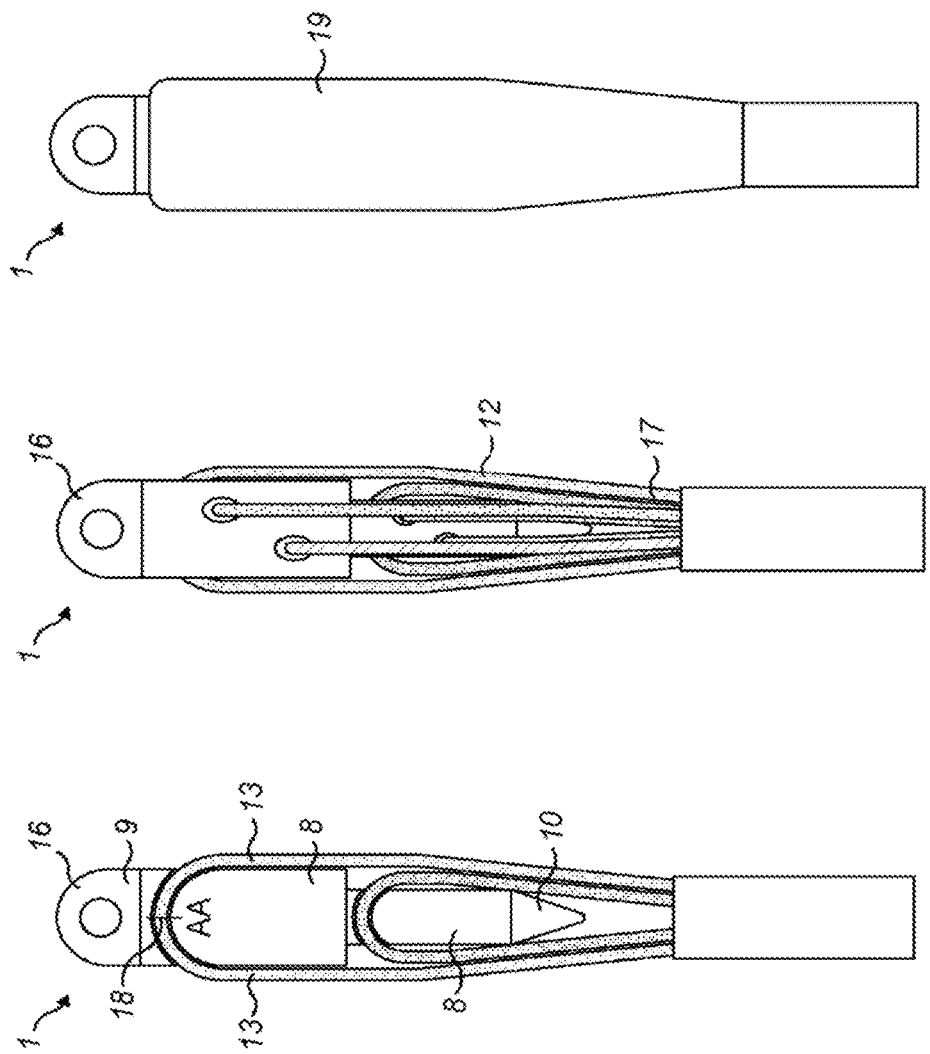

DEVICE FOR TERMINATION OF A ROPE

The present invention relates to a device suitable for use in termination of a rope. In particular, the invention relates to a device suitable for use in splicing a rope.

In addition, the invention relates to a method of terminating the end of a rope. The rope can be manufactured from synthetic fibres or constructed from multiple subropes.

BACKGROUND OF THE INVENTION

It is known to terminate ropes at their ends using a spliced eye. This is where the full body of the rope is bent around to form an eye. A tail end of the rope is spliced back into a standing part of the rope. The splice is completed by hand as this is generally the most strength efficient method of terminating a rope.

When ropes are of a sufficient size, they are generally constructed from a number of smaller ropes referred to as subropes. These are laid along the axis of the rope and are held together by an outer jacket which is braided over the top of them.

Depending on the application a filter layer can be applied between the loadbearing subropes and the outer jacket. This filter layer stops the ingress of particles that could induce damage and allows contact with the seabed.

Larger ropes that are used in, but not limited to, offshore applications are typically connected to steel fittings. These can be in the form of spool thimbles that are located in the spliced eye which are then connected to shackles and chains. Other examples of rope connections include steel H-links for direct connection to chain or other segments of fibre rope.

The main purpose of the spool thimble and/or H-link is to provide support of the rope around the eye in a prescribed shape.

In conventional splicing, it is important to have the subropes laid around the eye in the correct orientation. Due to the geometry around the eye the subropes on the inside have a shorter length when compared to the subropes on the outside of the eye. This difference needs to be carefully accounted for in splicing otherwise it will lead to length differences between subropes, resulting in a less efficient rope.

In addition, subropes are normally laid in multiple layers within the eye. A steel spool goes some way to achieving this, but it remains essential to maintain subropes in the correct layers and prevent them burying into the layer beneath.

In light of the problems discussed above, various proposals have been made, but there remains a need for an improved device for terminating a rope which addresses one or more of the problems presented by prior art arrangements. In this regard, the present invention seeks to provide an alternative which preferably addresses one or more of the problems presented by prior art arrangements.

SUMMARY OF THE INVENTION

In accordance with a first aspect of the present invention there is provided a device for termination of a rope which comprises a cylinder extending longitudinally from a base to a cone or pyramid, wherein the cylinder defines at least one channel for receiving a pair of subropes substantially perpendicular to the longitudinal axis of the cylinder.

In use, the device is placed coaxially with a rope so that the cone or pyramid abuts the rope or is positioned adjacent the rope. One subrope from a pair of subropes extends into the channel from a first end of the channel, and a second subrope from the pair of subropes extends into the channel from a second end of the channel. The first subrope is spliced into the second subrope and the second subrope is spliced into the first subrope.

Preferably, the cylinder is a solid cylinder. Alternatively, the cylinder is tubular.

Preferably, the cylinder has a circular cross section. Alternatively, it has an oval or polygonal cross section. In an embodiment where the cylinder has a polygonal cross section, the cylinder extends to a pyramid wherein the pyramid has a number of faces corresponding to a number of sides of the polygon.

Preferably the cone or pyramid tapers to a point. Alternatively, the cone or pyramid is a frustocone or frustopyramid.

Preferably, the cylinder defines a plurality of channels substantially perpendicular to the longitudinal axis of the cylinder.

Preferably, an opening is defined at each end of the channel and the openings are located diametrically opposite each other on the cylinder.

Preferably, each channel is curved between the openings, wherein the curve extends towards the base of the cylinder between the openings. Alternatively, preferably, each channel is located along a diameter of the cylinder.

Preferably, each channel is defined by a wall having a substantially circular cross section.

Preferably, each channel defines a bearing point. In one embodiment, the bearing point is located where the inner curve of the channel is proximate to the base of the cylinder.

Preferably, the bearing point is equidistant from each opening.

Preferably, each channel is spaced longitudinally from an adjacent channel. Preferably, the longitudinal spacing between each channel is equal.

Preferably, each channel is equally angularly offset. In this regard, for example, in one embodiment, there are two channels aligned at right angles to each other. In another embodiment, there are three channels aligned at 60 degrees from each other.

In another embodiment, there are four channels aligned at 45 degrees from each other. In another embodiment, there are five channels aligned at 36 degrees from each other.

Preferably, the end of each channel is defined by a smoothly radiused curve where the channel opens into an outer wall of the cylinder. Advantageously, this avoids each subrope contacting a sharp edge.

Preferably, the cylinder defines paths for each subrope. Preferably, each path extends smoothly into a channel.

Preferably, the base adjoins a termination connection. Preferably, the termination connection is capable of being changed to suit any end fitting. This can be, for example, a pad eye or a clevis to suit a shackle, a chain end link or another fibre rope termination.

Preferably, the device is of steel or synthetic/polymer composite structure. More preferably, it is of steel. Preferably, the steel is of offshore grade steel. Advantageously, this matches the chain and shackles used in offshore equipment and ensures that there are no issues with corrosion of each item.

In one embodiment, the device comprises a plurality of cylinders of different diameter. Advantageously, if the number of subropes or their diameters are too large for them to all fit around the outer wall of a single cylinder, then a plurality of stepped cylinders which can be separate or joined is provided.

Preferably, the plurality of cylinders includes cylinders having different diameters for inner subropes and a larger diameters for outer subropes. The invention is not limited in the number of steps or different diameters, which could be multiple. The splicing of the subropes and finishing is the same regardless of the number of cylinders.

In accordance with a second aspect of the present invention there is provided a method for terminating a rope, which comprises the steps of splitting the rope into pairs of subropes, placing the subropes of each pair in the channel(s) of the device of the invention, and splicing each pair together.

Preferably, the method comprises the steps of milking back an outer jacket and/or filter if fitted, from the end of the eye. This provides the advantage of exposing the subropes inside and allows a first pair of subropes to be laid each side of the termination.

Preferably, each subrope in a pair of subropes has a splicing mark applied at location A to indicate the start of a splice.

Preferably, a subrope on a first side is threaded through the channel in the cylinder until the AA marks are aligned. Preferably, the subrope is then spliced into the subrope on a second side using a conventional splice method. Preferably, this process is again repeated with the subrope on the second being threaded through the channel and spliced into the subrope on the first side.

Preferably, the splicing process is repeated for the remaining subropes in the main rope. For example, when a rope has six subropes they are spliced into three pairs. These pairs are located in three channels in the cylinder which are rotated 60 degrees to each other.

Preferably, each splice has a starting point, wherein the starting point of each splice is at the bearing point in the device of the invention. In this regard, it has been known to use spliced subropes in pairs, but the known splices start further down the rope away from the eye. By starting each splice at the bearing point, it provides the advantage of a stronger and more secure splice.

Advantageously, the method can be applied to suit any number of subrope pairs being equally rotated around the longitudinal axis of the device of the invention.

Advantageously, the method can be used with any subrope construction e.g. 3 strand, 4 strand, 8 strand, 12 strand. In addition, it can be used with subropes manufactured from any synthetic yarn type e.g. Polyester, Nylon, Aramids, High Modulus Polyethylene.

Preferably, during the splicing step, a protective jacket or tubular cloth is applied individually over the spliced subrope and into the body of the rope.

Preferably, the method includes the step of applying a protective layer over the subropes and termination device by using polyurethane or similar polymer to finish.

Advantageously, the method of the invention can be used for termination of ropes that are constructed in a single body and not from multiple subropes. These rope constructions are normally of plaited or stranded designs which comprise a number of strands within the structure. These designs can include, but are not limited to 6, 8, 12 or 16 strands. The rope is spliced using a standard eye splice method but the strands are passed through the holes in the device of the invention. The termination is finished in the same way as described above with a protective layer of polyurethane or similar polymer.

BRIEF DESCRIPTION OF THE DRAWINGS

The invention will now be further described with reference to the accompanying drawings in which:

FIG. 2A shows details of a device according to an embodiment of the invention, wherein the rope has three pairs of subropes;

FIG. 2B shows a second view of a device according to an embodiment of the invention depicted in FIG. 2A;

FIG. 2C shows a third view of a device according to an embodiment of the invention depicted in FIG. 2A;

FIG. 2D shows a fourth view of a device according to an embodiment of the invention depicted in FIG. 2A;

FIG. 2E shows a fifth view of a device according to an embodiment of the invention depicted in FIG. 2A;

FIG. 2F shows a sixth view of a device according to an embodiment of the invention depicted in FIG. 2A;

FIG. 3A shows a details of a device according to a further embodiment of the invention, wherein two cylinders are included; and FIG. 3B shows a second view of a device according to a further embodiment of the invention depicted in FIG. 3A;

FIG. 3C shows a third view of a device according to a further embodiment of the invention depicted in FIG. 3A;

DETAILED DESCRIPTION OF THE INVENTION

It will be appreciated that aspects, embodiments and preferred features of the invention have been described herein in a way that allows the specification to be written in a clear and concise way. However, unless circumstances clearly dictate otherwise, aspects, embodiments and preferred features can be variously combined or separated in accordance with the invention. Thus, preferably, the invention provides a device having features of a combination of two or more, three or more, or four or more of the aspects described herein. In a preferred embodiment, a device in accordance with the invention comprises all aspects of the invention.

Within the context of this specification, the word "about" means plus or minus 20%, more preferably plus or minus 10%, even more preferably plus or minus 5%, most preferably plus or minus 2%.

Within the context of this specification, the word "substantially" means preferably at least 90%, more preferably 95%, even more preferably 98%, most preferably 99%.

Within the context of this specification, the word "comprises" means "includes, among other things" and should not be construed to mean "consists of only".

The invention provides a device (1) for termination of a rope (2) as well as a method for terminating a rope (2).

Figure 1B:
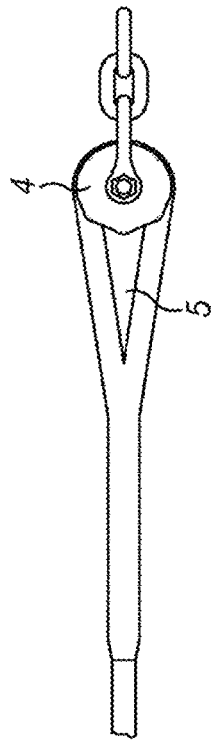
FIG. 1B shows a second view of known rope terminations depicted in FIG. 1A.
Figure 1A:
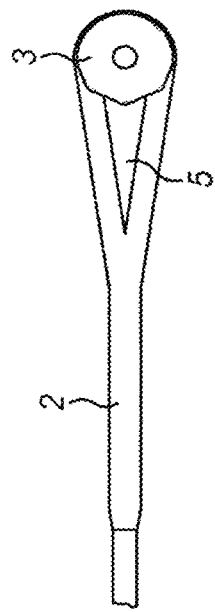
FIG. 1A shows a first view of known rope terminations, where an eye spice is formed around a spool thimbles. The spool thimble can be connected to a shackle, which can be connected to a chain.
Figure 1C:
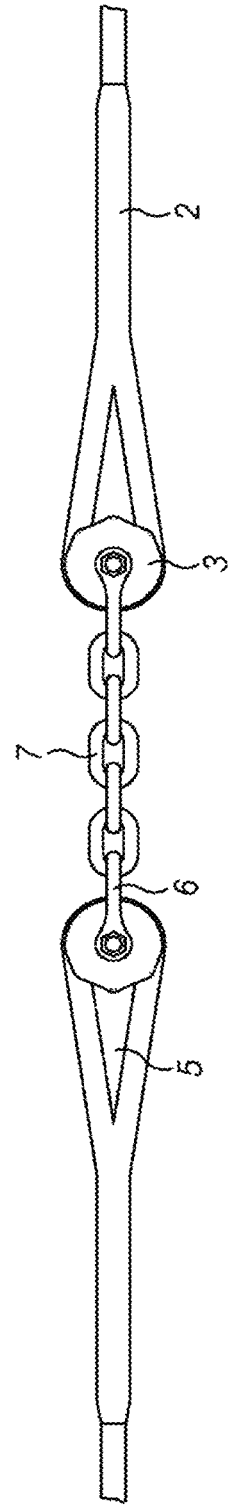
FIG. 1C shows a third view of known rope terminations depicted in FIG. 1A.

In the past, larger ropes (2) that are used, for example in offshore applications, are typically connected to steel fittings (3). These can be in the form of spool thimbles (4) that are located in a spliced eye (5) which are then connected to shackles (6) and chains (7). FIGS. 1A, 1B, and 1C illustrate this.

As shown in FIGS. 2A-2F, an embodiment of the invention comprises a steel device (1) for termination of a rope (2) which comprises a cylinder (8) extending longitudinally from a base (9) to a cone (10), wherein the cylinder (8) defines at least one channel (11) for receiving a pair of subropes (12) substantially perpendicular to the longitudinal axis of the cylinder (8).

The device (1) is placed coaxially with a rope (2) so that the cone (10) is positioned adjacent the rope (2). The rope (2) shown in FIGS. 2A-2F has six subropes (12). These are separated into three opposite pairs (13). One subrope (12) from a pair (13) of subropes (12) extends into a channel (11) from a first end (14) of the channel (11), and a second subrope (12) from the pair (13) of subropes (12) extends into the channel (11) from a second end (15) of the channel (11). The first subrope (12) is spliced into the second subrope (12) and the second subrope (12) is spliced into the first subrope (12).

The cylinder (8) is a solid cylinder having a circular cross section.

The cone (10) tapers to a point.

The cylinder (8) defines a plurality of channels (11) substantially perpendicular to the longitudinal axis of the cylinder (8).

Each channel (11) is located along a diameter of the cylinder (8).

Each channel (11) is spaced longitudinally from an adjacent channel (11) and the longitudinal spacing between each channel (11) is equal.

Each channel (11) is equally angularly offset. In this regard, there are three channels (11) aligned at 60 degrees from each other.

The end (14, 15) of each channel (11) is defined by a smoothly radiused curve where the channel (11) opens into an outer wall of the cylinder (8). Advantageously, this avoids each subrope (12) contacting a sharp edge.

The base (9) adjoins a termination connection (16). The termination connection (16) is capable of being changed to suit any end fitting. In the Figures, the end fitting is a pad eye or a clevis to suit a shackle, a chain end link or another fibre rope termination.

As shown in FIGS. 3A, 3B, and 3C, one embodiment of the device (1) comprises two cylinders (8) of different diameter. The splicing of the subropes (12) and finishing is the same regardless of the number of cylinders (8).

The device (1) is used in a method for terminating a rope (2), which comprises the steps of splitting the rope (2) into pairs (13) of subropes (12), placing the subropes of each pair in the channel(s) (11) of the device (1), and splicing each pair (13) together.

The method comprises the steps of milking back an outer jacket (17) and/or filter if fitted, from the end of the eye. This provides the advantage of exposing the subropes (12) inside and allows a first pair (13) of subropes (12) to be laid each side of the termination (1), as shown in FIG. 2A.

Each subrope (12) in a pair of subropes has a splicing mark (18) applied at location A to indicate the start of a splice.

A subrope (12) on a first side is threaded through a channel (11) in the cylinder (8) until the AA marks are aligned. A first subrope (12) is then spliced into the subrope (12) on a second side using a conventional splice method. This process is again repeated with the subrope (12) on the second being threaded through the channel (11) and spliced into the subrope (12) on the first side. Advantageously, this forms a spliced pair (13) as shown in FIG. 2B.

The splicing process is repeated for the remaining subropes (12) in the main rope (2). FIG. 2C shows six subropes (12), spliced into three pairs (13). These pairs are located in three channels (11) in the cylinder (8) which are rotated 60 degrees to each other.

The method can be applied to suit any number of subrope pairs being equally rotated around the longitudinal axis of the device (1) of the invention.

The method can be used with any subrope (12) construction e.g., 3 strand, 4 strand, 8 strand, 12 strand. In addition, it can be used with subropes (12) manufactured from any synthetic yarn type e.g. Polyester, Nylon, Aramids, High Modulus Polyethylene.

During the splicing step, a protective jacket or tubular cloth is applied individually over the spliced subrope (12) and into the body of the rope (2).

The method includes the step of applying a protective layer (19) over the subropes (12) and termination device (1) by using polyurethane or similar polymer to finish.

Figure 4A:
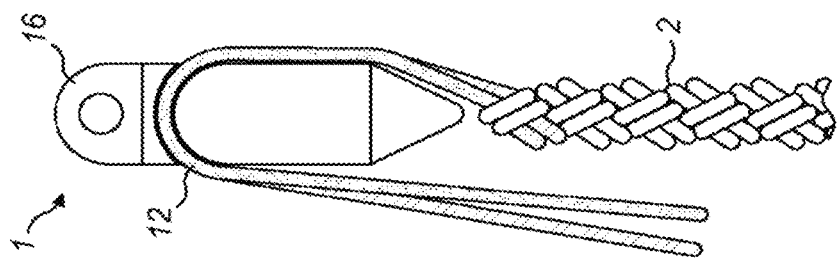
FIG. 4A shows a details of a device according to an embodiment of the invention used with plaited rope.
Figure 4B:
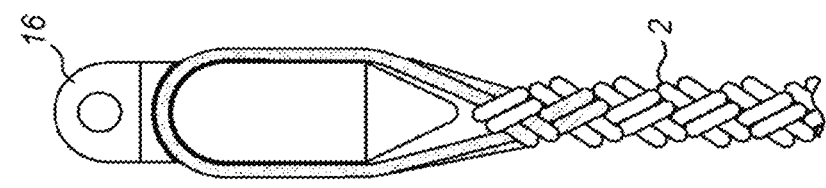
FIG. 4B shows a second view of a device according to an embodiment of the invention depicted in FIG. 4A.
Figure 4C:
FIG. 4C shows a third view of a device according to an embodiment of the invention depicted in FIG. 4A.

Advantageously, the method of the invention can be used for termination of ropes (2) that are constructed in a single body. These rope constructions are normally of plaited or stranded designs which comprise a number of strands within the structure. These designs can include, but are not limited to 6, 8, 12 or 16 strands. The rope (2) is spliced using a standard eye splice method but the strands are passed through the holes (11) in the device (1) of the invention. The termination is finished in the same way as described above with a protective layer (19) of polyurethane or similar polymer. FIGS. 4A, 4B, and 4C show details of the splicing method.

The benefits of a rope termination according to the invention include but are not limited to:
1. A more efficient termination with less strength variation due to higher control on the subrope length differences.
2. Shorter end termination as the subrope splice starts at the end fitting.
3. Quicker to splice the whole end termination because the eye does not need to be rebuilt back together.
4. Total weight of steel will be reduced in the complete connection of the rope to other components.

The above described embodiments have been given by way of example only, and the skilled reader will naturally appreciate that many variations could be made thereto without departing from the scope of the invention.

The invention claimed is:

1. A device for termination of a rope which comprises a cylinder extending longitudinally from a base to a cone or pyramid, wherein;
   (a) the cylinder defines at least one channel for receiving a pair of subropes substantially perpendicular to the longitudinal axis of the cylinder; and
   (b) the cylinder is a solid cylinder or tubular; and
   (c) the cylinder has a circular cross section or an oval or polygonal cross section; and
   (d) the cone or pyramid tapers to a point or the cone or pyramid is a frustocone or frustopyramid; and
   (e) the cylinder defines a plurality of channels substantially perpendicular to the longitudinal axis of the cylinder; and
   (f) an opening is defined at each end of the channel and the openings are located diametrically opposite each other on the cylinder; and (g) each channel is curved between the openings, wherein the curve extends towards the base of the cylinder between the openings; and
(h) each channel is located along a diameter of the cylinder; and
(i) each channel is defined by a wall having a substantially circular cross section; and
(j) each channel defines a bearing point.

2. The device according to claim 1, wherein the bearing point is located where the inner curve of the channel is proximate to the base of the cylinder.

3. The device according to claim 2, wherein the bearing point is equidistant from each opening.

4. The device according to claim 3, wherein each channel is spaced longitudinally from an adjacent channel.

5. The device accordingly to claim 4, wherein the longitudinal spacing between each channel is equal.

6. The device according to claim 5, wherein each channel is equally angularly offset.

7. The device according to claim 6, wherein there are two channels aligned at right angles to each other, three channels aligned at 60 degrees from each other, four channels aligned at 45 degrees from each other or five channels aligned at 36 degrees from each other.

8. The device according to claim 7, wherein the end of each channel is defined by a smoothly radiused curve where the channel opens into an outer wall of the cylinder.

9. The device according to claim 8, wherein the cylinder defines paths for each subrope.

10. The device according to claim 9, wherein the base adjoins a termination connection.

11. The device according to claim 10, wherein the device is of steel or synthetic/polymer composite structure.

12. The device according to claim 11, wherein the device comprises a plurality of cylinders of different diameter.

13. A method for terminating a rope, which comprises the steps of:
providing a device which comprises a cylinder extending longitudinally from a base to a cone or pyramid, wherein the cylinder defines at least one channel for receiving a pair of subropes substantially perpendicular to the longitudinal axis of the cylinder,
milking back an outer jacket and/or filter if fitted, from the end of the rope,
splitting the rope into pairs of subropes,
placing the subropes of each pair in the channel(s) of said device, and splicing each pair together.

14. The method of claim 13, wherein each subrope in a pair of subropes has a splicing mark applied to indicate the start of a splice.

15. The method of claim 14, wherein a subrope on a first side is threaded through the channel in the cylinder and a subrope on a second side is threaded through the channel in the opposite direction until the marks are aligned.

16. The method of claim 15, wherein the subrope is spliced into the subrope on a second side using a conventional splice method and this step is repeated with the subrope on the second being threaded through the channel and spliced into the subrope on the first side.

17. The method of claim 16, wherein the splicing process is repeated for the remaining subropes in the main rope.

18. The method of claim 17, wherein each splice has a starting point, wherein the starting point of each splice is at the bearing point in the device.

19. The method of claim 18, wherein during the splicing step, a protective jacket or tubular cloth is applied individually over the spliced subrope and into the body of the rope.

20. The method of claim 19, wherein the method includes the step of applying a protective layer over the subropes and the device.

* * * * *